United States Patent [19]
Lukjan

[11] 3,722,499
[45] Mar. 27, 1973

[54] BOLT AND DAMPER CONSTRUCTION

[76] Inventor: Serge Lukjan, Rte. 2, Evergreen Rd., Frankfort, Ky. 40601

[22] Filed: Mar. 25, 1971

[21] Appl. No.: 128,009

[52] U.S. Cl.............................126/292, 85/1 L, 85/9
[51] Int. Cl................................................F23l 3/00
[58] Field of Search.........126/292, 295, 285; 85/1 H, 85/1 L, 9

[56] References Cited

UNITED STATES PATENTS

| | | | |
|---|---|---|---|
| 2,188,450 | 1/1940 | Verdon-Roe | 85/9 R |
| 1,426,098 | 8/1922 | Pruitt | 85/9 R |
| 2,106,093 | 1/1938 | Goese | 126/292 |
| 2,146,142 | 2/1939 | Heasley | 126/285 R |
| 870,309 | 11/1907 | Neal | 126/292 |
| 2,183,292 | 12/1939 | Kerentoff | 126/292 |

Primary Examiner—Meyer Perlin
Assistant Examiner—Ronald C. Capossela
Attorney—Bosworth, Sessions, Herrstrom & Cain

[57] ABSTRACT

A novel bolt construction is provided that is self-locating and self-locking with respect to a mating portion of a workpiece, particularly a flat-surfaced workpiece such as a plate. The bolt is especially designed for adjustably securing a damper plate within a pipe or duct. The bolt has a cut-away section to receive an edge of a plate and hook or anchoring means to catch or latch the plate. The bolt holds the plate against the side of a duct or the like solely by tension exerted along the bolt.

17 Claims, 4 Drawing Figures

PATENTED MAR 27 1973 3,722,499
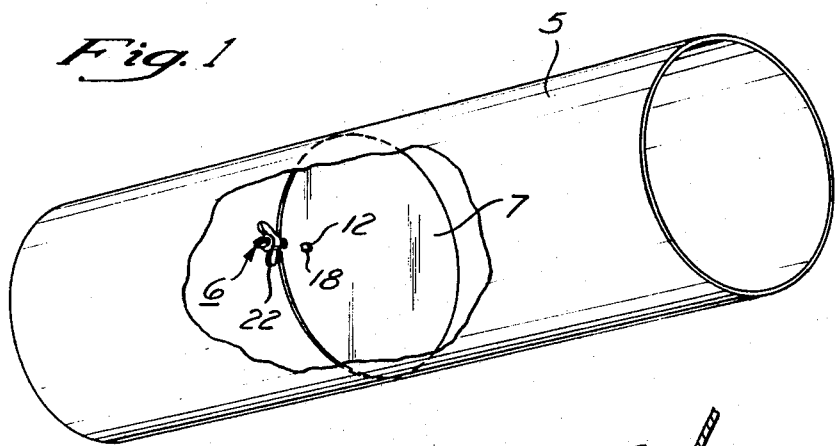
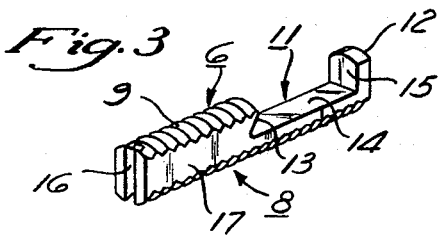
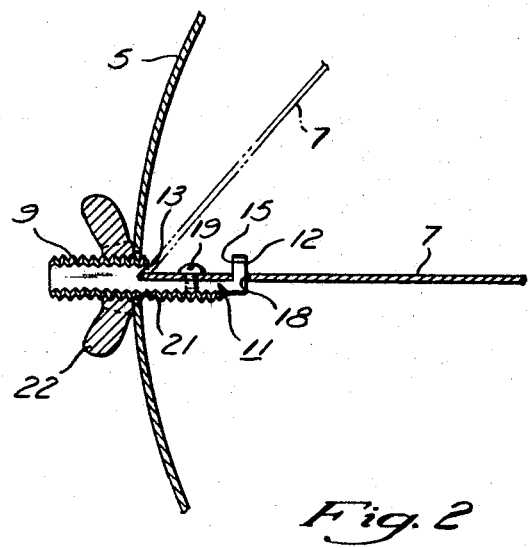
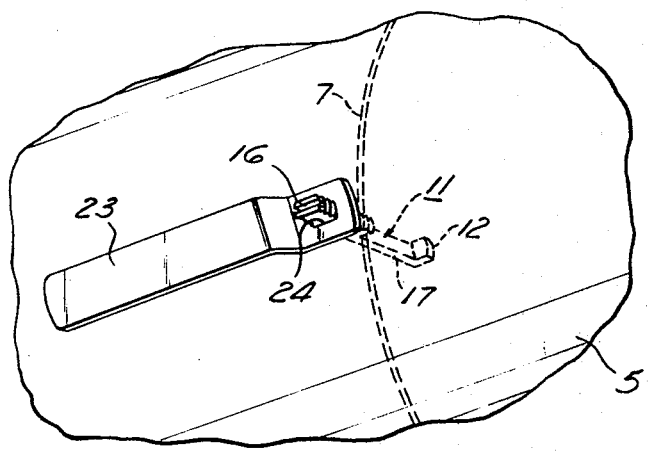
INVENTOR.
SERGE LUKJAN
BY Bosworth, Sessions,
Herrstrom & Cain
ATTORNEYS

BOLT AND DAMPER CONSTRUCTION

BACKGROUND OF THE INVENTION

The present invention relates to an improved bolt construction for securing a flat-surfaced workpiece to the bolt and, more particularly, to a bolt for mounting and regulating a damper plate in a duct, pipe, conduit, and the like.

Adjustably mounted dampers have long been used to regulate the amount of fluid flow through ducts. Various structural devices have been suggested to mount a damper plate within a duct. They have been characterized by relatively complex structures which only complicate the installation of a damper plate and, more significantly, unduly increase the expense of manufacturing such devices.

For example, it is common practice to punch openings in opposite diametrical sides of a circular duct or pipe in which to rotate mounted ends of one or more stems or rods secured to a damper. As the stems rotate, the position of the damper plate is adjusted. Such constructions are illustrated by U.S. Pat. No. 541,733 to Farwell et al. and No. 2,183,292 to Kerentoff.

Further, it has been the practice to use coiled springs in damper mounting devices to tension the parts and hold the damper in position, such as are illustrated in U.S. Pat. No. 870,309 to Neal and No. 1,521,250 to Olinger. Damper mounting structures also frequently include an extra clip or reinforcing plate which is fixed over an area of the damper plate where the device for mounting it is to be secured. U.S. Pat. No. 1,096,563 to Rosenberg and No. 1,521,249 to Olinger illustrate this practice which adds significantly to the cost of manufacturing and fabricating the damper plate.

Damper mounting devices of the type described also result in clearances between the mounting devices and the interior of the duct or pipe which reduce the efficiency of the damper.

SUMMARY OF THE INVENTION

The present invention provides a bolt construction for mounting a flat-surfaced workpiece, such as a damper plate, with respect to a duct or the like and is free of the objections described. The bolt is of simple construction and easily and inexpensively manufactured. In mounting the bolt, only one opening need be made in a duct. The bolt requires no springs or reinforcing clips or plates and, indeed, no extra parts at all except for a conventional nut.

By virtue of its novel structure, the present bolt is self-locating and self-locking with respect to securing a workpiece to the bolt. Moreover, the structural feature which serves to locate a bolt with respect to a workpiece also serves to aid in securing the bolt and workpiece together. Further, the same bolt is able to accommodate workpieces, such as a plate, of varying thicknesses.

In one form, the bolt comprises a shank portion, preferably of substantially uniform cross-section, which is threaded at one end for engaging a conventional nut member. Adjacent another end, the shank portion has a laterally-open, cut-away recess which includes a radially-extending side, an axially-disposed bearing surface which intersects the radially-extending side, and laterally-extending hook means.

In use, an edge of a workpiece such as a damper plate is placed in contact with the intersection between the radially-extending side and the axially-disposed bearing surface, and the laterally-extending hook means engages or penetrates the workpiece at a distance along the workpiece measured by the distance of the hook means from the radially-extending side of the recess. This places a surface of the workpiece against the bearing surface of the recess which for this purpose preferably has mating configurations.

The bolt also has turning means adapted to be engaged in turning the bolt and its workpiece about a longitudinal axis of the bolt in adjusting their positions.

BRIEF DESCRIPTION OF THE DRAWING

The accompanying drawing illustrates a presently preferred embodiment in which:

FIG. 1 is a perspective view of a duct or pipe with a part broken away to illustrate one form of the present bolt and damper construction;

FIG. 2 is a fragmentary, enlarged sectional view taken along a central longitudinal axis of the bolt of FIG. 1 and at right angles to the damper plate;

FIG. 3 is an enlarged, perspective view of the bolt of FIG. 1; and

FIG. 4 is an enlarged, fragmentary, perspective view of FIG. 1 and illustrates the use of the lever to adjust the position of the bolt and damper plate.

DESCRIPTION OF THE PREFERRED EMBODIMENT

Referring to the drawing, the embodiment illustrated includes a conventional duct 5, such as a hot air duct of a furnace, in which a bolt generally indicated at 6 is the sole means of supporting and holding a circular damper plate 7 with respect to the duct 5. As illustrated especially in FIGS. 2 and 3, the bolt 6 comprises a shank portion 8 of uniform cross-section having one end externally threaded as at 9. The body of the bolt has a laterally open, cut-away recess generally indicated at 11 which terminates in a laterally-extending flange 12 defining hook means. The recess 11 is three-sided, being open laterally in two directions at right angles to each other, as shown by FIG. 3. The three sides include a radially-extending side 13, an axially-disposed bearing surface 14 intersecting the radially-extending side, and a facing side 15 of the flange 12.

Preferably, side 13 of the recess is angled inwardly of the shank portion 6 and toward the threaded end 9 to form an acute angle with the longitudinally-extending bearing surface 14, for example, about 45°. The flange 12 is disposed substantially at a right angle to a longitudinal axis of the bolt and to the bearing surface 14. The bearing surface is preferably but not necessarily slightly below a central longitudinal axis of the bolt, as illustrated in FIG. 3. In order to seat closely with a contacting surface of a workpiece, the bearing surface 14 and such workpiece surface preferably have mating configurations. Since damper plates like plate 7 normally are flat, the bearing surface 14 is also usually flat and parallel to the central longitudinal axis of the bolt 6.

The bolt has turning means adapted to be engaged to rotate the bolt about a longitudinal axis. Two of such means are embodied in the bolt as illustrated. The threaded end 9 has a radially-extending slot 16 for engaging a tool such as a screwdriver. The bolt also has flats 17 extending lengthwise and on opposite sides of the shank portion 8 for optional use with a lever.

In use, the bolt 6 is self-locating and self-locking with respect to the plate 7. A circular edge of the plate is rammed against the intersection of side 13 of the recess and the bearing surface 14 as illustrated, for convenience of reference, by the dotted line position of the plate 7 in FIG. 2, although it will be understood that the initial self-locating and self-locking action of the bolt with respect to the plate is done outside of the duct 5. By swinging the plate 7 downwardly toward the flange 12 while the intersection of side 13 and bearing surface 14 serves as a fulcrum for the edge of the plate, the location of a desired opening in plate 7 is immediately determined.

If desired, the tip of the flange 12 can be used to scribe its position on the plate 7, and a separate tool such as a punch then used to form an opening 18 in the plate at that spot (FIG. 2). Or the flange 12 itself can be used to force the opening 18 as by hammering on the plate 7, which may be made from thin sheet metal, until the flange 12 penetrates the plate 7. The flange thereupon hooks or catches the plate and locks it to the bolt 6. A flat side of the plate 7 lies against the flat bearing surface 14 as shown in FIG. 2. The frictional grip of the bolt on the plate formed in this manner is sufficient to retain the parts in assembly. If desired, however, fastening means can be used to secure the flat surface portion of the plate 7 to the bearing surface 14 of the recess. For example, the plate 7 and bearing surface 14 can be drilled and tapped to receive a set screw 19 (FIG. 2).

Because of the bevel or slant of side 13, this angled end is suited to receive the edge of various damper plates regardless of their thickness. In each case, the edge of a plate is wedged into a corner between the side 13 and bearing surface 14 and frictionally held because of the inclination noted.

Once the opening 18 has been formed, the parts are separated and the plate 7 positioned in the duct 5 by known techniques. The bolt 6 is then inserted through a single opening 21 in the duct 5, flange 12 first, and the parts reassembled as shown in FIG. 2. A nut such as a wing nut 22 screws on the threaded end 9.

When the nut 22 is tightened, the plate 7 is drawn in a plane along its major face toward the duct 5, until an edge of the plate 7 sufficiently bears against the inside of the duct in cooperation with the wing nut 22 to hold the parts in assembly. To adjust the position of the bolt and damper plate, it is necessary only to loosen the nut 22 and by a screwdriver fitted in slot 16 turn the bolt and plate as desired. Alternatively, a lever may be used to turn the bolt as shown in FIG. 4. In this case, a lever 23 may be used having an offset end provided with an opening 24 matching the cross-sectional configuration of the bolt 6 and particularly one having straight sides to grip the flats 17 of the shank portion 8. If desired, the lever 23 may be kept in place by placing it between the outside of the duct 5 and the nut 22.

The bolt of the present invention is of simple structure and yet affords a self-locating and self-locking action with respect to a damper plate or the like. The bolt is attached directly to a damper plate with no intervening clip or plate and has no springs or other auxiliary parts except a conventional nut. In use, the bolt requires only one opening in the duct 5 and one opening in the damper plate 7.

Although for convenience, the present bolt has been described in connection with a damper plate, it will be apparent that the bolt can be used in still other environments where it is desired to attach a surface of a workpiece to a bolt. Within the field of damper constructions, the damper plate need not be circular as has been illustrated for convenience, but it can be rectangular or square as illustrated in U.S. Pat. No. 1,096,563 to Rosenberg.

While the foregoing describes a presently preferred embodiment, it is understood that the invention may be practiced in other forms within the scope of the following claims.

I claim:

1. Bolt means comprising a shank portion having one end externally threaded and a longitudinally-extending, laterally open recess adjacent another end, said recess having a longitudinally-extending surface adapted to contact a member to be secured to the bolt means and terminating in laterally-extending hook means and having a side closer to said threaded end that is angled inwardly of the bolt means and toward said threaded end to form an acute angle with said longitudinally-extending surface.

2. The bolt means of claim 1 including nut means engaging said externally threaded end.

3. The bolt means of claim 1 in which said longitudinally-extending surface of the recess is substantially flat.

4. The bolt means of claim 1 in which said longitudinally-extending surface and the central longitudinal axis of the bolt means are parallel.

5. The bolt means of claim 1 in which said hook means is a flange disposed substantially at a right angle to a longitudinal axis of the bolt means.

6. The bolt means of claim 1 having turning means adapted to be engaged to turn the bolt about a longitudinal axis.

7. The bolt means of claim 6 in which said turning means is a radially-directed slot adjacent said threaded end.

8. The bolt means of claim 6 in which said turning means is opposed flats extending lengthwise of the shank portion.

9. In combination: bolt means comprising a shank portion having one end threaded and a longitudinally-extending, laterally-open recess adjacent another end, said recess including a radially-extending side, an axially-disposed bearing surface intersecting the radially-extending side, and laterally-extending hook means, and a workpiece mounted with respect to said bolt means, said workpiece having an edge portion contacting substantially the intersection between said radially-extending side and said axially-disposed bearing surface, a surface portion resting against said bearing surface of the recess, and anchor means engaging said hook means.

10. The combination of claim 9 including a mounting member to which said bolt means and workpiece are detachably secured, said mounting member having an opening through which said threaded end of the bolt means extends from one side of the mounting member, and nut means engaging said threaded end from an opposite side of said mounting member and adapted to move said workpiece against said member to hold the bolt means, workpiece, and mounting member in assembly.

11. The combination of claim 9 in which said bearing surface of the recess and the surface portion of the workpiece have mating configurations.

12. The combination of claim 9 in which said radially-extending side of the recess is angled inwardly of the bolt means and toward said threaded end to form an acute angle with said axially-disposed bearing surface, whereby said recess accommodates edge portions of workpieces of varying thicknesses.

13. The combination of claim 9 in which said hook means is a flange disposed substantially at a right angle to a longitudinal axis of the bolt means.

14. The combination of claim 9 having turning means adapted to be engaged in turning the bolt means about a longitudinal axis.

15. The combination of claim 9 in which said workpiece is frictionally held to the bolt means by said contact with the intersection between said radially-extending side and said axially-disposed bearing surface and by engagement of the anchor means with the hook means.

16. The combination of claim 9 in which fastening means secures said surface portion of the workpiece with said bearing surface of the recess.

17. The combination of claim 9 in which said workpiece is a circular disc having a peripheral edge contacting substantially said intersection between said radially-extending side and said axially-disposed bearing surface, and an opening defining said anchor means to receive said hook means.

* * * * *